United States Patent [19]
Kallin et al.

[11] Patent Number: 5,357,559
[45] Date of Patent: Oct. 18, 1994

[54] LISTENING CONTROL CHANNEL IN A CELLULAR MOBILE RADIOTELEPHONE SYSTEM

[75] Inventors: Harald Kallin, Sollentuna; Anna Fallgren, Stockholm, both of Sweden

[73] Assignee: Telefonaktiebolaget L M Ericsson, Stockholm, Sweden

[21] Appl. No.: 806,141

[22] Filed: Dec. 12, 1991

[51] Int. Cl.$^5$ .......................................... H04M 11/00
[52] U.S. Cl. .................................... 379/59; 455/33.4; 455/56.1
[58] Field of Search .................. 379/59, 60; 455/33.1, 455/33.2, 33.4, 54.1, 56.1

[56] References Cited

U.S. PATENT DOCUMENTS

| | | |
|---|---|---|
| 3,898,390 | 8/1975 | Wells et al. . |
| 4,127,744 | 11/1978 | Yoshikawa et al. . |
| 4,128,740 | 12/1978 | Graziano . |
| 4,144,409 | 3/1979 | Utano et al. . |
| 4,144,411 | 3/1979 | Frenkiel . |
| 4,144,496 | 3/1979 | Cunningham et al. . |
| 4,163,121 | 7/1979 | Yoshikawa et al. . |
| 4,527,284 | 7/1985 | Röttger . |
| 4,551,852 | 11/1985 | Grauel et al. . |
| 4,597,105 | 6/1986 | Freeburg . |
| 4,639,937 | 1/1987 | McRae et al. . |
| 4,675,863 | 6/1987 | Paneth et al. . |
| 4,696,051 | 9/1987 | Breeden . |
| 4,723,266 | 2/1988 | Perry . |
| 4,726,014 | 2/1988 | Goldman et al. . |
| 4,765,753 | 8/1988 | Schmidt . |
| 4,771,448 | 9/1988 | Koohgoli et al. . |
| 4,775,998 | 10/1988 | Felix et al. . |
| 4,797,947 | 1/1989 | Labedz ................................. 455/33 |
| 4,932,049 | 6/1990 | Lee . |
| 4,965,849 | 10/1990 | Kunihiro . |
| 4,984,247 | 1/1991 | Kaufmann et al. ..................... 375/1 |
| 5,014,344 | 5/1991 | Goldberg . |

(List continued on next page.)

FOREIGN PATENT DOCUMENTS 0505105  9/1992  European Pat. Off. .

OTHER PUBLICATIONS

Patent Abstracts of Japan, vol. 013, No. 541 (E-854) 5 Dec. 1989 & JP-A-12 023 834 (NEC).
World publication, WO 88/08650, Nov. 3, 1988.
IEEE Transactions on Vehicular Technology, vol. 40, No. 2, "Capacity of Digital Celular TDMA Systems", Raith et al., May 1991, pp. 323-332.
Sixth International Conference on Mobile Radio and Personal Communications, "A Handover Protocol for a Mixed Cell System", Chia, Conference date Dec. 9-11 1991, pp. 225-232.

*Primary Examiner*—Curtis Kuntz
*Assistant Examiner*—Dwayne D. Bost
*Attorney, Agent, or Firm*—Burns, Doane, Swecker & Mathis

[57] ABSTRACT

A cellular mobile radiotelephone system listens for call accesses on a control channel of an umbrella cell and on a control channel of a microcell located within said umbrella cell and responds to the call access only on the control channel of the umbrella cell. More particularly, the microcells within a particular umbrella cell are provided with listen-only control channel at the same frequency as the uplink control channel of the umbrella cell. An umbrella cell and one or several of its microcells may therefore each receive the same call accesses. During call access, the umbrella cell and each of the microcells determines the strength of the received signal and forwards this information to the system. The system selects the most appropriate cell out of the umbrella cell and the microcells to handle the call and causes the umbrella cell to respond to the call access on its downlink control channel. Among the umbrella cell and its microcells, there are therefore a plurality of uplink control channels, one for each defined cell, and a single downlink control channel, namely that of the umbrella cell. Cell planning remains unchanged as does a directed retry mechanism. Because there is only a single downlink control channel within the coverage area of an umbrella cell, excessive rescanning is avoided. Furthermore, a call is established at the outset in the most appropriate cell, using resources more efficiently and avoiding congestion in the umbrella cell.

16 Claims, 6 Drawing Sheets

U.S. PATENT DOCUMENTS 5,038,399 8/1991 Bruckert .
5,038,403 8/1991 Leitch .
5,040,238 8/1991 Comroe et al. .
5,042,083 8/1991 Ichikawa .
5,046,128 9/1991 Bennett .
5,058,201 10/1991 Ishii et al. .
5,067,147 11/1991 Lee .
5,067,173 11/1991 Gordon et al. .
5,081,704 1/1992 Umeda et al. .
5,251,249 10/1993 Allen et al. ............................ 379/59

LISTENING CONTROL CHANNEL IN A CELLULAR MOBILE RADIOTELEPHONE SYSTEM

FIELD OF THE INVENTION

The present invention relates to cell planning and frequency allocation in a cellular mobile radiotelephone system.

BACKGROUND OF THE INVENTION

Figure 1:
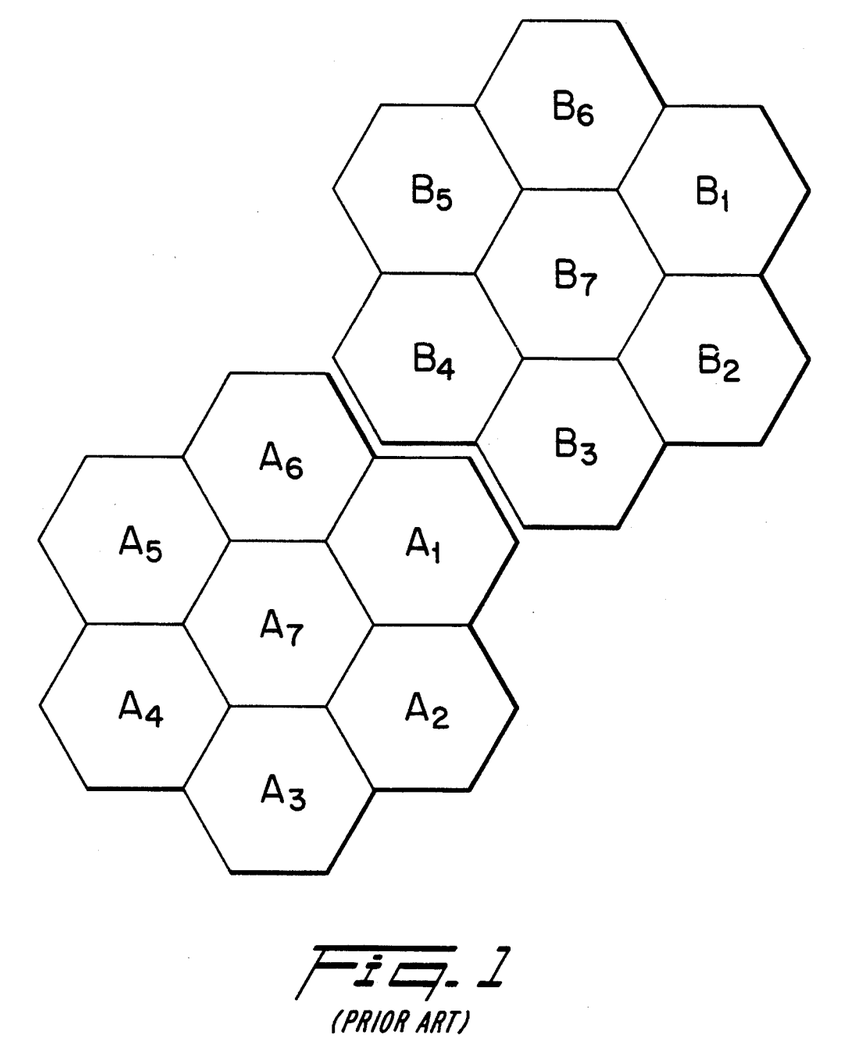
FIG. 1 is a cell plan illustrating two cell clusters in a cellular mobile radiotelephone system.

FIG. 1 illustrates two cell clusters A and B forming part of a cellular mobile radiotelephone system in a manner well-known in the art. Typically, all of the frequencies of a system are used in each cell cluster. Within the cell cluster, the frequencies are allocated to different cells so as to achieve the greatest uniform distance, known as the frequency reuse distance, between cells in different clusters using the same frequency. In FIG. 1, cells $A_1$ and $B_1$ both use a common frequency as do cells $A_2$ and $B_2$, cells $A_3$ and $B_3$, etc. The radio channels in cells $A_1$ and $B_1$ using the same frequency are referred to as co-channels because they share the same frequency. Although some interference will generally occur between co-channels, the level of such interference in an arrangement such as that of FIG. 1 is normally acceptable. The cell plan of FIG. 1 therefore allows for a relatively simple frequency allocation and provides for an acceptably low level of co-channel interference.

Figure 2:
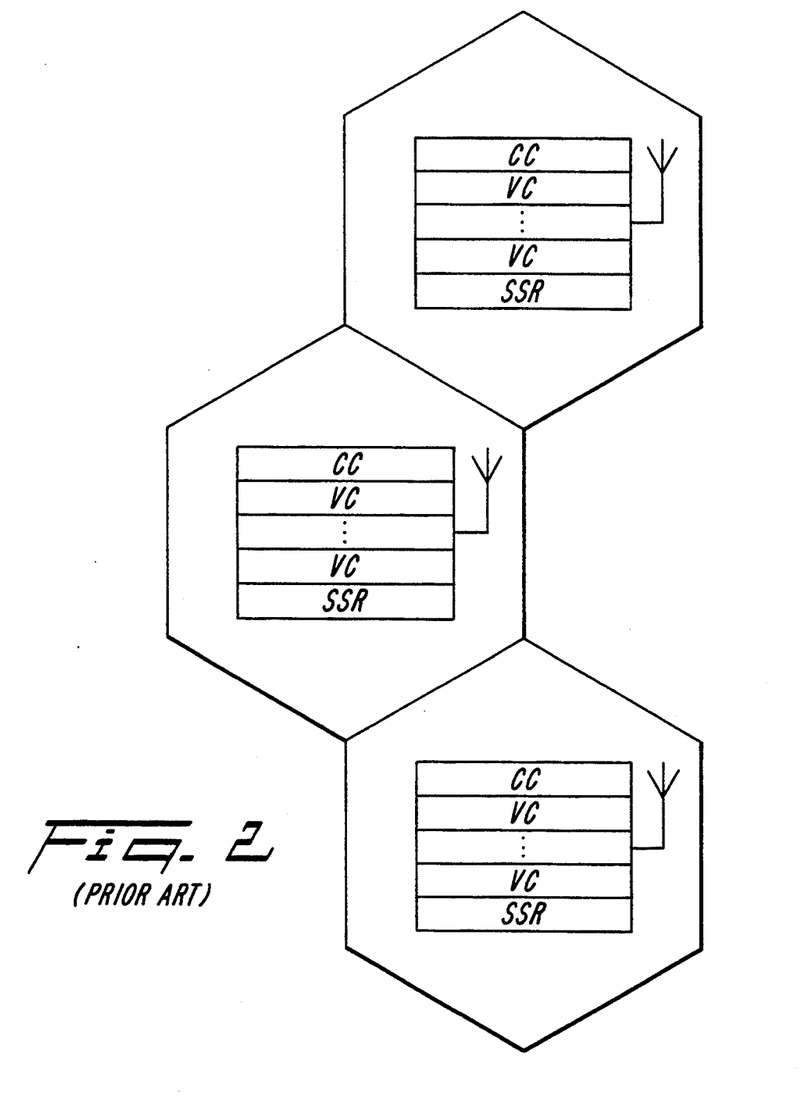
FIG. 2 shows three adjacent cells and their respective base stations, in particular showing the channel units of the base station.

It is also well-known in the art for radio base stations located near the center of each cell (or near the center of three adjacent "sector cells") to provide radio coverage throughout the area of the cell as illustrated in FIG. 2. The base station consists in part of a number of channel units, typically including a single control channel CC, a number of voice channels VC, and a single strength receiver SSR. For convenience, only three cells are illustrated in FIG. 2.

Figure 3:
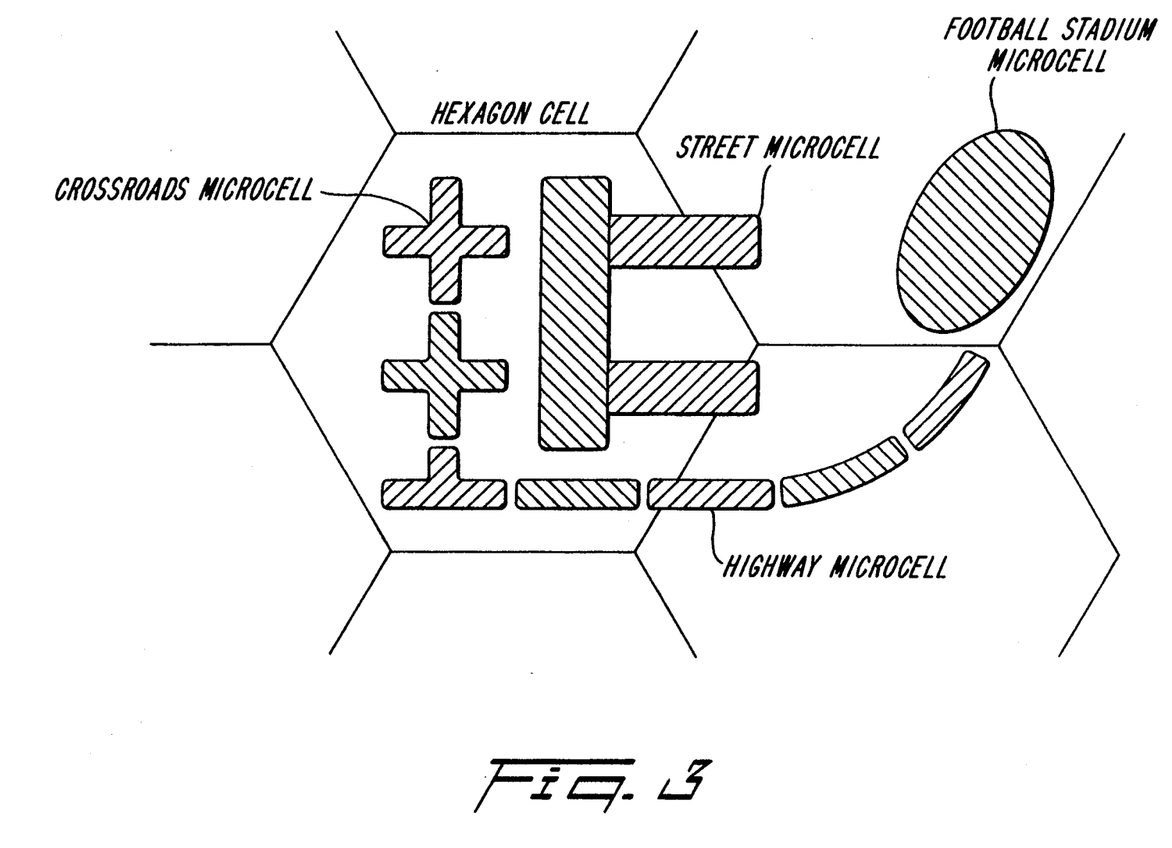
FIG. 3 is a cell plan showing a number microcells in relation to their umbrella cells.

The cell plan of FIGS. 1 and 2 assumes a relatively uniform distribution of mobile radiotelephone users throughout the area of a cell. To handle relatively dense concentrations of mobile users, a preferable arrangement is to establish localized "microcells" as illustrated in FIG. 3. Microcells allow additional voice channels to be physically located in close proximity to where they are actually needed, boosting cell capacity while maintaining low levels of interference. Microcells may cover thoroughfares such as crossroads or streets, and a series of microcells may provide coverage of major traffic arteries such as highways. Microcells may also cover large buildings such as a football stadium or a shopping mall, for example.

A mobile station chooses a cell to access by selecting the cell having the strongest control channel as received at the mobile station. A mobile station in FIG. 3, for example, may choose to access a microcell or may choose to access an umbrella cell, assuming all base stations are provided with transmitting control channels, an umbrella cell being defined as a cell covering one or more other cells.

Although microcells provide an attractive way to increase cell capacity, they also pose a number of problems from the standpoint of cell planning and frequency allocation. One problem that arises with the increasing use of microcells is that the number of control channel frequencies available in the system is limited. Out of typically 300 to 400 available frequencies, 21 are normally allocated for use as control channels. The 21 control channel frequencies are normally extensively reused in a 21 cell repeating pattern similar to the smaller 7 cell repeating pattern of FIG. 1. In introducing microcells in cells that are already part of a 21 cell repeating pattern, great care must be taken to select a control channel for use by the microcell that will not result in intolerable interference. Regardless, interference between control channels inevitably increases. If more than the normal 21 control channel frequencies are used for control channels, less channels will be available for voice/speech channels. If each microcell uses a control channel, the relative amount of hardware for control channels is higher than in conventional cells, since the microcell is likely to be equipped with fewer voice channels than the conventional cells. Another problem arises because of the existing structure of the air interface between the base station and the mobile stations. If a cell is congested, i.e., all of the cell's voice channels are occupied, additional would-be users are directed to try other nearby cells. According to the present structure of the air interface, a maximum number of 6 cells may be suggested to be investigated by the user. Absent microcells, the 6 suggested cells would be the 6 neighboring cells of a given cell in the regular hexagonal pattern. With the increasing use of microcells, more than 6 microcells might be located within a single umbrella cell. Determining the composition of the cell list sent in connection with a directed retry instruction therefore becomes difficult. If a microcell may satisfactorily handle a call, interference is generally reduced. The coverage of microcells, however, is very limited. Furthermore, the microcells may have a relatively small number of voice channels compared to the umbrella cell so that congestion at a particular microcell frequently occurs. Under such circumstances, it is difficult to determine when reference to a microcell should be substituted for a reference to a neighboring umbrella cell in a directed retry message. When the capacity of the microcells is small, the frequency of directed retry messages increases.

Another problem involves the street corner effect that occurs when a mobile station travelling in a direction of coverage of a microcell changes directions so as to abruptly pass beyond the coverage of the microcell. In order to remain in contact with the system to receive possible calls, the mobile station must scan the designated control channel frequencies to determine a strongest one. During such rescanning, the mobile station is effectively "deaf", unable to respond to the system for some 10–15 seconds in a typical case. As the patchwork of microcells becomes more complex, the mobile station in the worst case may find itself continually rescanning the control channels and continually out of touch with the system.

One possible solution to the foregoing problems is to not provide a microcell with any control channel whatsoever. In such an instance, call set-up would be exclusively handled by the umbrella cell and traffic could be handed off afterward, preferably as fast as possible, to the appropriate microcell (if there is a microcell with a free voice channel) following a locating procedure. If the number of microcells is large, however, a lot of traffic would have to transit through the umbrella cell. A risk is posed that congestion will occur in the umbrella cell despite there being free capacity in one or more microcells. In addition, many calls would experience one extra hand-off, causing increased noise and risking the call being dropped.

What is needed is an arrangement that allows for the extensive use of microcells to increase system capacity but that does not complicate cell planning or limit the use of directed retry and does not result in excessive rescanning by the mobile stations.

SUMMARY OF THE INVENTION

According to the present invention, a cellular mobile radiotelephone system listens for call accesses on a control channel of an umbrella cell and on a control channel of a microcell located within said umbrella cell and responds to the call access only on the control channel of the umbrella cell. More particularly, the microcells within a particular umbrella cell are provided with listen-only control channel at the same frequency as the uplink control channel of the umbrella cell. Typically then, an umbrella cell and its microcells will receive the same call accesses, each microcell belonging entirely to only one umbrella cell. During call access, the umbrella cell and each of the microcells determines the strength of the received signal and forwards this information to the system. The system selects the most appropriate cell out of the umbrella cell and the microcells to handle the call and causes the umbrella cell to respond to the call access on its downlink control channel. Among the umbrella cell and its microcells, there are therefore a plurality of uplink control channels, one for each defined cell, and a single downlink control channel, namely that of the umbrella cell. Cell planning remains unchanged as does a directed retry mechanism. Because there is only a single downlink control channel within the coverage area of an umbrella cell, excessive rescanning is avoided. Furthermore, a call is established at the outset in the most appropriate cell and may be set up directly on a microcell voice channel, using resources more efficiently and avoiding congestion in the umbrella cell. Only one set of control channels is needed.

BRIEF DESCRIPTION OF THE DRAWINGS

These and other features and advantages of the invention will be readily apparent to one of ordinary skill in the art from the following written description, read in conjunction with the drawings, in which.

DETAILED DESCRIPTION OF THE PREFERRED EMBODIMENT

Figure 4:
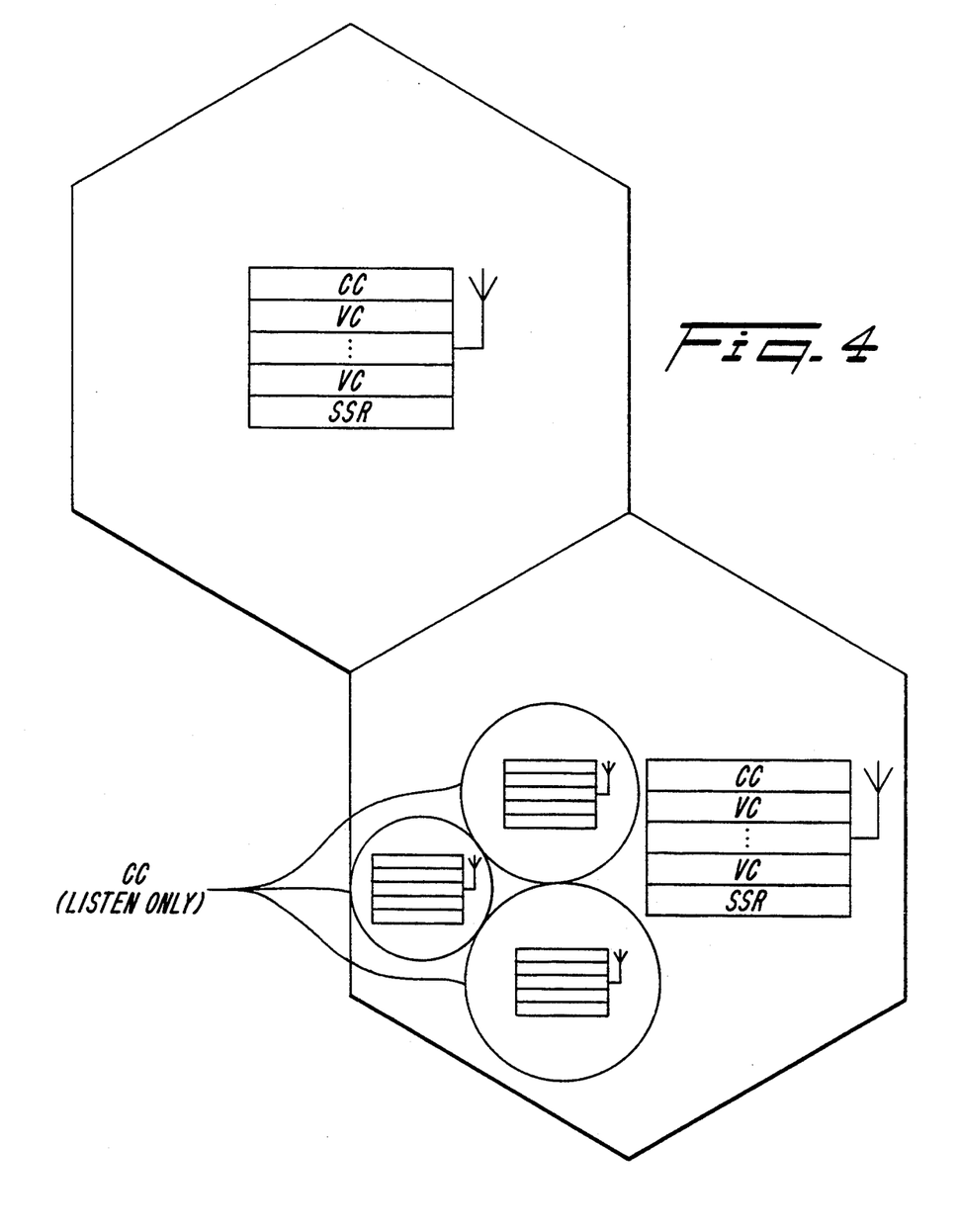
FIG. 4 shows two adjacent cells and their base stations and channel units, one of the cells having a plurality of microcells with listen-only control channels.

FIG. 4 is a representation of part of a cellular mobile radiotelephone system according to the present invention. The lower right-hand cell has several microcells within its coverage area. The large cell serves as an umbrella cell to the microcells.

Figure 5:
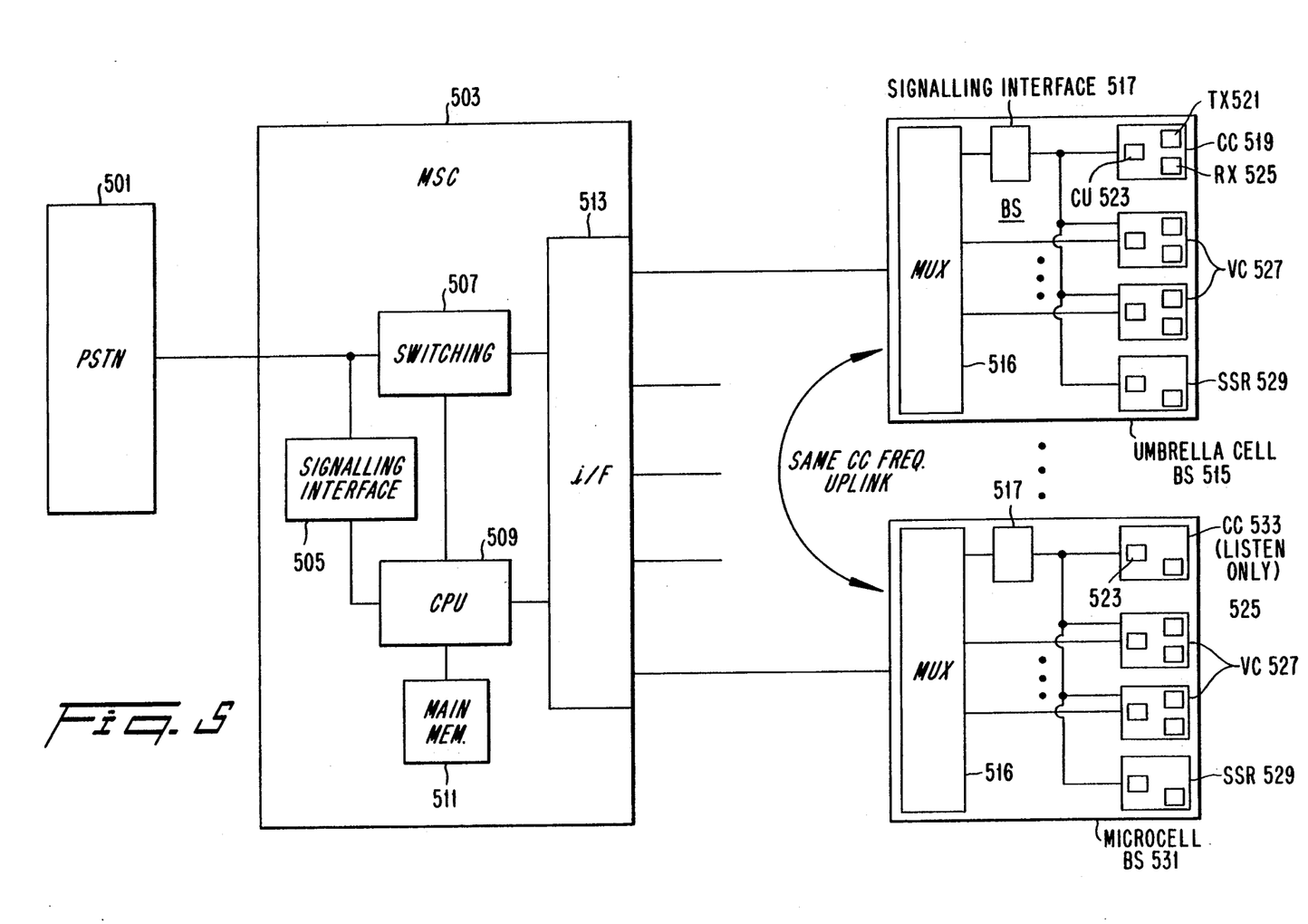
FIG. 5 is a simplified block diagram of a cellular mobile radiotelephone system according to the present invention.

In conventional cellular systems, a cell is equipped with several voice channel transceivers and one control channel transceiver used for control of the mobile stations and for call set-up. For microcells, which cover only a small area and have relatively few voice channels, equipping every microcell with a full control channel is expensive, power consuming, and difficult from a cell planning point of view as previously explained. According to the present invention therefore, the transmitter part of the control channel in each microcell base station is removed in order to reduce cost and power consumption, to improve call handling of the system, and to utilize resources more efficiently. The control channels of the base stations of the microcells in FIG. 4 are therefore listen-only. Referring to FIG. 5, a cellular mobile radiotelephone system according to the present invention will be described in greater detail. The system has base stations including a base station 515 belonging to an umbrella cell and a base station 531 belonging to a microcell connected through a mobile switching center (MSC) 503 to the public switched telephone network (PSTN) 501. The MSC 503 includes a switching module 507 and an interface module 513 controlled by a computer including a CPU 509 and a main memory 511. A signalling interface 505 allows control communications to be exchanged between the PSTN 501 and the MSC 503.

The base stations each include a number of voice channel units VC 527 and a single strength receiver 529. A channel unit comprises a radio transmitter and a radio receiver controlled by a control unit. Depending on whether the base station is that of an umbrella cell or a microcell, the base station also has a control channel unit CC 519 or 533. Control channel unit 519 of the base station 515 of the umbrella cell includes a radio transmitter TX 521, a radio receiver RX 525, and a control unit CU 523. The control channel unit CC 533 of the base station 531 of the microcell, on the other hand, includes only a radio receiver 525 and a control unit 523. The radio transmitter portion ordinarily found in a control channel unit has not been provided with the result that the control channel of the microcell is listen-only. In each base station, the control channel unit is connected through a signalling interface 517 to a multiplexer 516, to which is also connected each of the voice channel units 527 and the signal strength receiver 529 of the respective base stations. Each of the base stations is connected to the interface portion 513 of the MSC 503. As indicated by the double-headed curved arrow, the base station 515 of the umbrella cell and the base station 531 of the microcell both have the same control channel frequency in the uplink direction. As a result, the umbrella cell and the microcell may receive the same call accesses. In particular the umbrella base station hears all accesses and regulates accesses so that two mobile stations cannot make access simultaneously in a manner well-known in the art.

Figure 6:
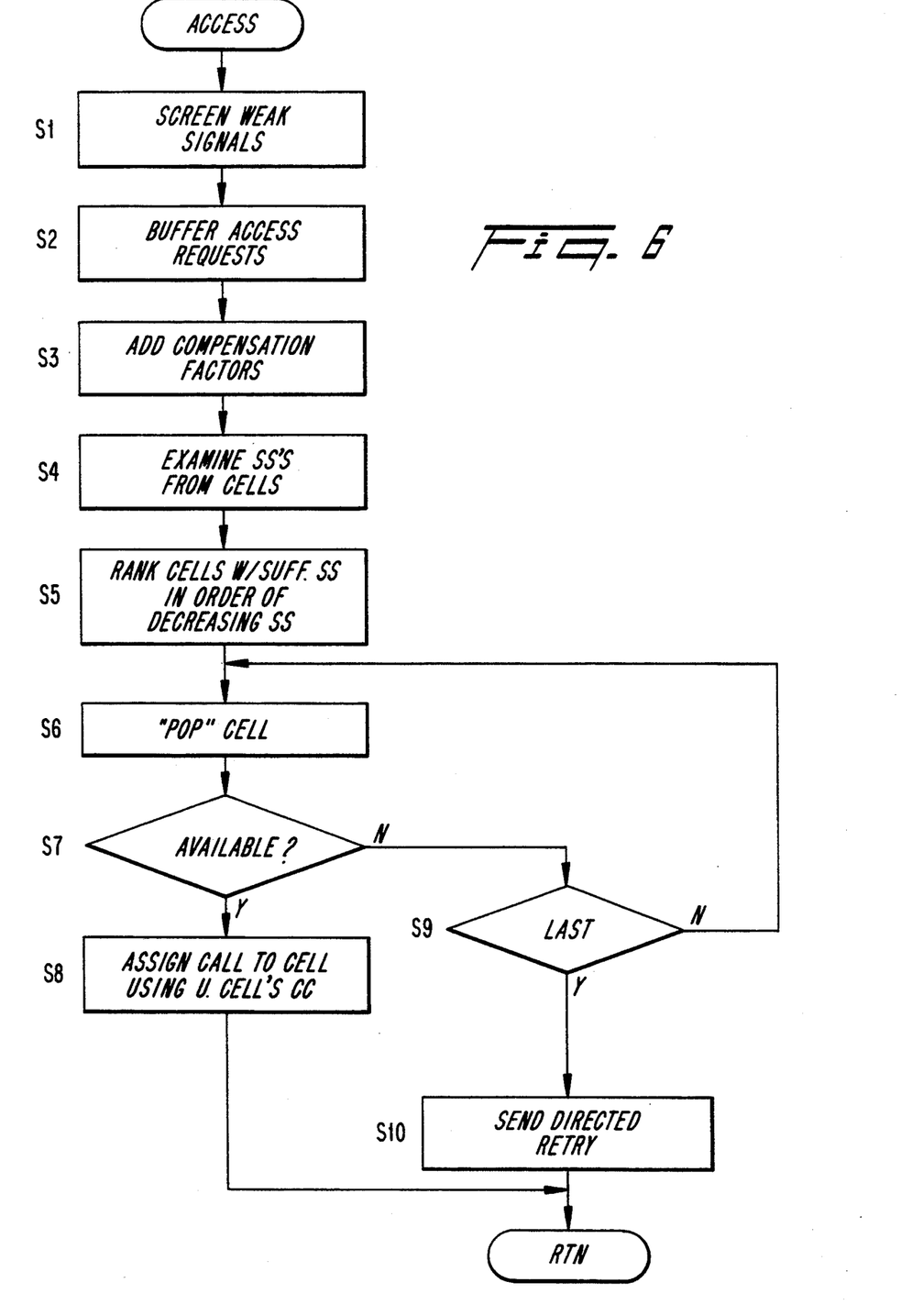
FIG. 6 is a flowchart illustrating a call access routine followed in the cellular mobile radiotelephone system of FIG. 5.

Call accesses are handled by a supervisory unit such as the mobile services center or the base station of the umbrella cell in a manner illustrated in FIG. 6. In a first step S1, call access requests are first screened to eliminate signals only weakly received and remaining call access requests are then temporarily buffered in step S2 to allow for the same request being received in different areas of the umbrella cell by the base station of the umbrella cell and one or more base stations of microcells to be forwarded to the mobile switching center (or other collecting point). The access requests are stored for a short period, for example, 100 ms, during which every base station that has received the same access request will have had time to forward the request to the mobile switching center. Transmitted to the mobile switching center along with the access request is an indication of the signal strength level at which the access request was received. Compensation factors may be added to the signal strengths in step S3. For example, compensation factors may be set cell-by-cell by the system operator on a semi-static basis based on previously acquired knowledge of the system, objectives for controlling cell sizes to avoid interference, the need to smooth out traffic between cells, etc. The compensation factors could also be more dynamic in nature and reflect, for example, the current traffic level in the cell. As a cell moved closer to congestion, more would be deducted from its reported signal strength to make that cell less attractive in the cell-selection process.

In a next step S4, the mobile switching center examines the signal strengths of access requests received from the base stations of the cells. In step S5, those cells that receive the access request at a sufficient signal strength level are ranked in order of decreasing signal strength (strongest first).

Following the ranking in step S5, in steps S6 and S7, the mobile switching center considers each of the cells in turn by "popping" a cell off a stack of cell identities formed during the ranking step. If the cell has an available voice channel as determined in step S7, the call is assigned to the microcell using the umbrella cell's control channel as shown in step S8. If the cell has no available voice channels, i.e., is congested, then the next cell is considered in turn until the last-ranked cell has been considered as determined in step S9. If none of the cells that receive the access request at a sufficient signal strength level has a voice channel available, then a directed retry message is sent in step S10. Because the microcells have no downlink control channel and do not transmit any control communications, the directed retry message need only designate the neighboring cells of the umbrella cell in the same manner as in the prior art.

In the selection process described above, the cell with the strongest received signal strength is selected, regardless if it is the umbrella cell or a microcell. Other alternatives are of course possible and may be advantageous under a given set of circumstances. For example, preference may be given to the strongest microcell among the sufficiently strong microcells with the umbrella cell being selected only if no microcell is available. Alternatively, a complete locating process may be performed including all the necessary evaluations typically made during locating prior to handoff as known from the prior art.

Since only the umbrella cell is equipped with a transmitting control channel, mobile stations do not tend to rescan as often as they would in a pure microcell environment. Furthermore, frequency planning with respect to the limited number of control channel frequencies is uncomplicated since umbrella cells can maintain a previous frequency plan without regard to added microcells. Cost savings and greater efficiency are promoted.

Although in the preferred embodiment the mobile switching center serves as the collection point for call access requests, the base station of the umbrella cell in which a call access request occurs may serve instead as the collecting point, as may a base station controller as for instance in the European GSM system.

In some cellular systems, handoff decisions are based upon measurements made by the mobile station. In such systems, the mobile station measures the signal strength from a transmitter constantly sending an RF carrier. The control channel is normally used for the continuous transmission.

In the case of "listening control channels", no such natural continuous transmitter exists, but a voice channel could be used for this purpose and be forced to transmit continuously even if there is no ongoing conversation on this channel. The mobile stations in neighboring cells would be requested to measure the signal strength from this channel instead of the control channel.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. In a cellular mobile radiotelephone system having at least one microcell and an umbrella cell with a coverage area that mostly or entirely overlaps a coverage area of said microcell and having supervisory means servicing said umbrella cell and said microcell, a call access method comprising the steps of:
   listening for call accesses on a bidirectional control channel of said umbrella cell and unidirectional uplink control channels of said microcells;
   communicating information concerning call accesses received by said umbrella cell and said microcell to said supervisory means;
   selecting in said supervisory means a cell to handle a call access if a suitable cell is available; and
   instructing said umbrella cell to respond to said call access on said bidirectional control channel of said umbrella cell.

2. In a cellular mobile radiotelephone system having at least one microcell and an umbrella cell with a coverage area that mostly or entirely overlaps a coverage area of said microcell and having supervisory means servicing said umbrella cell and said microcell, a call access method comprising the steps of:
   listening for call accesses on a bidirectional control channel of said umbrella cell and unidirectional uplink control channels of said microcells;
   communicating information concerning call accesses received by said umbrella cell and said microcell to said supervisory means;.
   selecting in said supervisory means a cell to handle a call access if a suitable cell is available; and
   instructing said umbrella cell to respond to said call access on said bidirectional control channel of said umbrella cell;
   during said listening step, measuring signal strength of call accesses received by said umbrella cell and said at least one microcell; and
   during said communicating step, communicating said signal strengths to said supervisory means.

3. The method of claim 2 comprising the further step of, previous to said communicating step, modifying said signal strengths according to compensation factors determined in said umbrella cell and said at least one microcell.

4. The method of claim 2 wherein said selecting step comprises the step of selecting a cell having a strongest signal strength associated therewith regardless of whether said cell is an umbrella cell or a microcell.

5. The method of claim 2 wherein said selecting step comprises performing a full locating process with respect to the call access.

6. The method of claim 2 wherein said selecting step comprises the steps of:
   selecting said umbrella cell to handle a call access if no microcell received said call access or if no microcell has associated therewith a sufficient level of signal strength of said call access; and
   selecting a microcell from said at least one microcell if said microcell has associated therewith a signal strength of said call access strongest out of said umbrella cell and said at least one microcell or if said microcell has associated therewith a signal strength of said call access that is of a sufficient level of signal strength.

7. The method of claim 6 wherein said instructing step comprises instructing said umbrella cell to send a directed retry message on said bidirectional control channel of said umbrella cell in response to said call access if none of said umbrella cell and said at least one microcell is available to handle said call access.

8. The method of claim 2 wherein said microcell includes a plurality of transceivers and comprising the further step of causing at least one of said plurality of transceivers to be transmitting at any given time such that radio measurements with respect to said microcell may be made at any time.

9. A cellular mobile radiotelephone system having at least one microcell and an umbrella cell with a coverage area that mostly or entirely overlaps a coverage area of said microcell, comprising:
   means for listening for call accesses on a bidirectional control channel of said umbrella cell and unidirectional uplink control channels of said microcells;
   supervisory means including means for selecting a cell to handle a call access if a cell is available;
   means for communicating information concerning call accesses received by said umbrella cell and said microcells to said supervisory means; and
   means for instructing said umbrella cell to respond to said call access on said bidirectional control channel of said umbrella cell.

10. A cellular mobile radiotelephone system having a plurality of microcells and an umbrella cell with a coverage area that mostly or entirely overlaps a coverage area of said microcell, comprising:
   means for listening for call accesses on a bidirectional control channel of said umbrella cell and unidirectional uplink control channels of said microcells;
   supervisory means including means for selecting a cell to handle a call access if a cell is available; p1 means for communicating information concerning call accesses received by said umbrella cell and said microcells to said supervisory means; and
   means for instructing said umbrella cell to respond to said call access on said bidirectional control channel of said umbrella cell;
   means for measuring signal strength of call accesses received by said umbrella cell and said microcell;
   wherein said means for communicating includes means for communicating said signal strengths to said supervisory means.

11. The apparatus of claim 10 further comprising means in said umbrella cell and said microcells for determining compensation factors and for modifying said signal strengths according to said compensation factors.

12. The apparatus of claim 10 wherein said means for selecting comprises means for selecting a cell having a strongest signal strength associated therewith regardless of whether said cell is an umbrella cell or a microcell.

13. The apparatus of claim 10 wherein said means for selecting comprises means for performing a full locating process with respect to the call access.

14. The apparatus of claim 10 wherein said means for selecting comprises:
   means for selecting said umbrella cell to handle a call access if no microcell received said call access or if no microcell has associated therewith a sufficient level of signal strength of said call access; and
   means for selecting one of said microcells if said one of said microcells has associated therewith a signal strength of said call access strongest out of said umbrella cell and said plurality of microcells or if said one of said microcells has associated therewith a signal strength of said call access that is of a sufficient level of signal strength.

15. The apparatus of claim 10 wherein said means for instructing comprises means for instructing said umbrella cell to send a directed retry message on said bidirectional control channel of said umbrella cell in response to said call access if no cell is available to handle said call access.

16. The apparatus of claim 10 wherein said microcell includes a plurality of transceivers and further comprising means for causing at least one of said plurality of transceivers to be transmitting at any given time such that radio measurements with respect to said microcell may be made at any time.

* * * * *